United States Patent
Kim et al.

(10) Patent No.: US 9,435,321 B2
(45) Date of Patent: Sep. 6, 2016

(54) SEAWATER RESISTANT GROUT MATERIAL COMPOSITION AND METHOD FOR CONSTRUCTING OFFSHORE WIND TURBINE STRUCTURE USING SAME

(71) Applicant: KOLON GLOBAL CORPORATION, Gwacheon-si, Gyeonggi-do (KR)

(72) Inventors: Kyoung Chul Kim, Seoul (KR); Se Jin Kim, Yongin-si (KR); Jae Uk Sim, Seoul (KR)

(73) Assignee: KOLON GLOBAL CORPORATION, Gwancheon-Si, Gyeonggi-Do (KR)

( * ) Notice: Subject to any disclaimer, the term of this patent is extended or adjusted under 35 U.S.C. 154(b) by 0 days.

(21) Appl. No.: 14/895,567

(22) PCT Filed: Jul. 8, 2013

(86) PCT No.: PCT/KR2013/006059
§ 371 (c)(1),
(2) Date: Dec. 3, 2015

(87) PCT Pub. No.: WO2014/196682
PCT Pub. Date: Dec. 11, 2014

(65) Prior Publication Data
US 2016/0108897 A1    Apr. 21, 2016

(30) Foreign Application Priority Data
Jun. 4, 2013    (KR) ........................ 10-2013-0064242

(51) Int. Cl.
| C04B 14/04 | (2006.01) |
| F03D 11/04 | (2006.01) |
| C04B 22/00 | (2006.01) |
| C04B 28/16 | (2006.01) |
| C04B 7/02 | (2006.01) |
| C04B 28/04 | (2006.01) |
| C04B 40/00 | (2006.01) |
| C04B 103/56 | (2006.01) |
| C04B 111/24 | (2006.01) |
| C04B 111/70 | (2006.01) |

(52) U.S. Cl.
CPC .............. *F03D 11/045* (2013.01); *C04B 7/02* (2013.01); *C04B 22/008* (2013.01); *C04B 28/04* (2013.01); *C04B 28/16* (2013.01); *C04B 40/0042* (2013.01); *F03D 13/22* (2016.05); *F03D 13/25* (2016.05); *C04B 2103/58* (2013.01); *C04B 2111/24* (2013.01); *C04B 2111/70* (2013.01); *F05B 2240/95* (2013.01); *Y02W 30/94* (2015.05)

(58) Field of Classification Search
CPC ..... C04B 14/04; C04B 14/06; C04B 18/141; C04B 24/00; C04B 7/02; C04B 22/008; C04B 28/04; C04B 28/16; C04B 40/0042; C04B 2103/58; C04B 2111/24; C04B 2111/70; E02D 27/52; E02D 27/525; F03D 11/045; F03D 13/22; F03D 13/25
See application file for complete search history.

(56) References Cited

U.S. PATENT DOCUMENTS 5,549,859 A * 8/1996 Andersen .............. B01F 3/1214
264/102

FOREIGN PATENT DOCUMENTS

| JP | 8-319143 | 12/1996 |
| JP | 2007-31244 A * | 2/2007 |
| JP | 2007-84420 A * | 4/2007 |
| JP | 2009-161377 | 7/2009 |
| KR | 10-0694267 | 3/2007 |
| KR | 10-0806637 | 2/2008 |
| KR | 10-2012-0001384 | 1/2012 |
| KR | 10-1143435 | 5/2012 |

OTHER PUBLICATIONS

International Search Report for International Application No. PCT/KR2013/006059, dated Mar. 5, 2014.

* cited by examiner

*Primary Examiner* — Anthony J Green
(74) *Attorney, Agent, or Firm* — Kile Park Reed & Houtteman PLLC

(57) ABSTRACT

The present invention provides a seawater resistant grout material composition and a method for constructing an offshore wind turbine structure using the same, the seawater resistant grout material composition comprising: 2~10 wt % of high strength admixture; 25~35 wt % of type I Portland cement; 30~45 wt % of silica sand having a particle size of 30~60 mesh; 5~15 wt % of silica sand having a particle size of 60~100 mesh; and 5~10 wt % of silica sand having a particle size of 100~200 mesh, wherein the high strength admixture is obtained by mixing and pulverizing 45~99 wt % of slag and 1~55 wt % of anhydrite, thus the present invention has excellent seawater resistance, excellent strength development characteristics at a low temperature, and increased compressive strength and durability to allow withstanding cyclic loads due to wind and wave pressure.

9 Claims, 4 Drawing Sheets

SEAWATER RESISTANT GROUT MATERIAL COMPOSITION AND METHOD FOR CONSTRUCTING OFFSHORE WIND TURBINE STRUCTURE USING SAME

TECHNICAL FIELD

The present invention relates to a civil engineering technology, and more particularly, to a seawater resistant gout material composition and a method for constructing an offshore wind turbine structure using the same.

BACKGROUND ART

An offshore wind turbine structure indicates a structure where a basis is formed at a sea bottom and an upper propeller is exposed to the outside of a water surface, which means a structure for generating by using offshore wind.

The offshore wind turbine structure formed at the sea bottom should satisfy the following conditions.

Firstly, the offshore wind turbine structure should have high strength to withstand very large cyclic loads due to wind and wave pressure.

Secondly, the offshore wind turbine structure should have a seawater resistant (salt resistant) property, since it is exposed to marine salt.

However, grout compositions which have been developed so far do not satisfy the above conditions. Accordingly, a new grout composition which satisfies the above conditions should be developed.

DISCLOSURE OF THE INVENTION

Therefore, an object of the present invention is to provide a seawater resistant grout material composition, capable of having excellent seawater resistance, excellent strength development characteristics at a low temperature, and increased compressive strength and durability to allow resistance to cyclic loads due to wind and wave pressure, and a method for constructing an offshore wind turbine structure using the same.

To achieve these and other advantages and in accordance with the purpose of the present invention, as embodied and broadly described herein, there is provided a seawater resistant grout material composition including: 2~10 wt % of high strength admixture; 25~35 wt % of type I Portland cement; 30~45 wt % of silica sand having a particle size of 30~60 mesh; 5~15 wt % of silica sand having a particle size of 60~100 mesh; and 5~10 wt % of silica sand having a particle size of 100~200 mesh, wherein the high strength admixture is obtained by mixing and pulverizing 45~99 wt % of slag and 1~55 wt % of anhydrite.

Preferably, the high strength admixture may have a degree of particle size of 7000~10,000cm$^2$/g.

Preferably, the seawater resistant grout material composition may further include 3~10 wt % of shrinkage compensation material obtained by mixing CAS, CaO and CaSO$_4$ with each other.

Preferably, the seawater resistant grout material composition may further include: 0.05~0.5 wt % of polycarboxylate-based synthetic plasticizer; 0.1~0.3 wt % of polyglycol-based defoaming agent; and 0.3~1.0 wt % of calcium sulphur aluminate-based hardener.

To achieve these and other advantages and in accordance with the purpose of the present invention, as embodied and broadly described herein, there is also provided a seawater resistant grout material including the seawater resistant grout material composition and water, wherein a water-cement ratio is 12~18 wt %.

To achieve these and other advantages and in accordance with the purpose of the present invention, as embodied and broadly described herein, there is still also provided a method for constructing an offshore wind turbine structure, including: forming punch holes by punching a sea bottom; installing piles in the punch holes, and grouting by the grout material; and installing an offshore wind turbine structure above the piles.

Advantageous Effects

The present invention has excellent seawater resistance, excellent strength development characteristics at a low temperature, and increased compressive strength and durability to allow resistance to cyclic loads due to wind and wave pressure.

BRIEF DESCRIPTION OF THE DRAWINGS

FIG. 1 is a graph illustrating a result on measurement of compressive strength;

FIG. 2 is a graph illustrating an experimental result on resistance to chlorine ion penetration;

FIG. 3 is a sectional view illustrating a step of forming a punch hole;

FIG. 4 is a sectional view illustrating a step of grouting; and

FIG. 5 is a sectional view illustrating a step of installing a structure.

MODES FOR CARRYING OUT THE PREFERRED EMBODIMENTS

Figure 1:
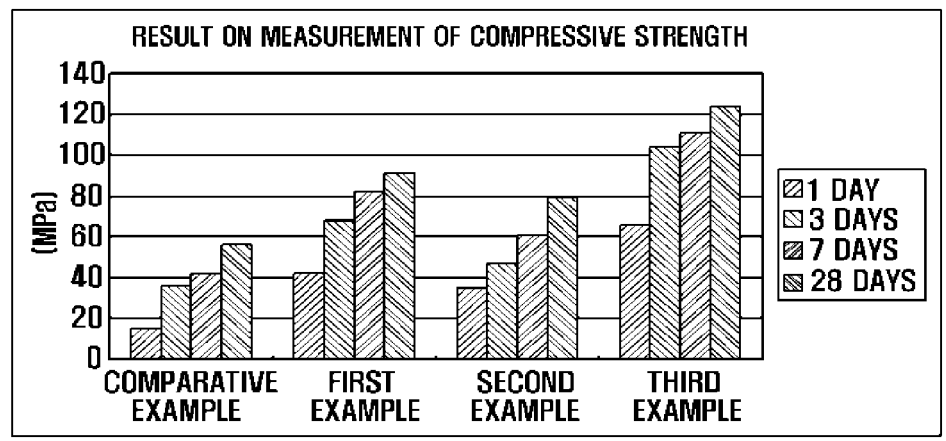
FIGS. 1 and 2 illustrate experimental results on performance tests of a seawater resistant grout material composition according to the present invention.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a seawater resistant grout material composition and a method for constructing an offshore wind turbine structure using the same according to an example, with reference to the accompanying drawings.

The seawater resistant grout material composition according to the present invention includes: 2~10 wt % of high strength admixture; 25~35 wt % of type I Portland cement; 30~45 wt % of silica sand having a particle size of 30~60 mesh; 5~15 wt % of silica sand having a particle size of 60~100 mesh; and 5~10 wt % of silica sand having a particle size of 100~200 mesh.

The high strength admixture is obtained by mixing and pulverizing 45~99 wt % of slag and 1~55 wt % of anhydrite.

Generally, a grout material for forming a basis of an offshore wind turbine structure should have the following properties.

Firstly, drying shrinkage should be less than 0.5 mm/m based on 100 days.

Secondly, strength should be more than 80 MPa.

Thirdly, the amount of chlorine ion penetration should be less than 1500 Coulomb.

As an example of a grout material according to the present invention, a grout composition was formed by mixing 2~10 wt % of high strength admixture, 25~35 wt % of type I Portland cement, 30~45 wt % of silica sand having a particle size of 30~60 mesh, 5~15 wt % of silica sand having a particle size of 60~100 mesh, and 5~10 wt % of silica sand having a particle size of 100~200 mesh with one another. And a grout material was prepared by mixing the grout composition with 12~18 wt % of water-cement.

It was shown that the conventional grout material does not satisfy the above conditions, whereas the grout material according to an example of the present invention satisfy the above conditions.

Thus, in case of constructing an offshore wind turbine structure by using the grout material of the present invention, a structure having excellent seawater resistance, excellent strength development characteristics at a low temperature, and increased compressive strength and durability to allow resistance to cyclic loads due to wind and wave pressure, can be obtained.

Table 1 shows a mixing ratio of components of the grout material composition of the present invention, according to a first example.

TABLE 1

| Division | Mixing Ratio [wt %] |
|---|---|
| High strength admixture | 2~10 |
| Type 1 Portland cement | 25~35 |
| Silica sand having particle size of 30~60 mesh | 30~45 |
| Silica sand having particle size of 60~100 mesh | 5~15 |
| Silica sand having particle size of 100~200 mesh | 5~10 |

Firstly, the high strength admixture preferably has a degree of particle size of 7000~10,000 cm$^2$/g. And the high strength admixture is obtained by mixing and pulverizing 45~99 wt % of slag and 1~55 wt % of anhydrite.

Table 2 shows a mixing ratio of components of the high strength admixture.

TABLE 2

| Division | Mixing Ratio [wt %] |
|---|---|
| Slag | 45~99 |
| Anhydrite | 1~55 |

In case of preparing a grout material composition by containing such a high strength admixture, the following mechanism is generated.

Firstly, the high strength admixture reacts with calcium aluminate ($3CaO.Al_2O_3$) among components of cement, thereby generating ettringite ($3CaO.AL_2O_3.3CaSO_4.32H_2O$).

Then, the ettringite reacts with a calcium hydroxide ($Ca(OH)_2$) generated by a hydration reaction between water and cement, thereby forming a calcium silicate hydrate (C—S—H group).

The high strength admixture maintains high strength by reducing the amount required for paste, with enhanced fluidity owing to a filling effect of fine particles.

This is advantageous in that strength is exhibited at a standard curing condition (20° C.), and compressive strength more than 100 MPa (28 days) is obtained even at a low-temperature curing condition (5° C.).

That is, high strength concrete piles or a high strength concrete structure can be obtained by using the high strength admixture in the grout material composition of the present invention.

Further, the high strength admixture can be prepared with low costs, since it is formed by using slag, industrial waste. This is preferable in an environmental aspect.

Table 3 shows a mixing ratio of components of the grout material composition of the present invention, according to a second example.

TABLE 3

| Division | Mixing Ratio [wt %] |
|---|---|
| High strength admixture | 2~10 |
| Type 1 Portland cement | 25~35 |
| Silica sand having particle size of 30~60 mesh | 30~45 |
| Silica sand having particle size of 60~100 mesh | 5~15 |
| Silica sand having particle size of 100~200 mesh | 5~10 |
| Shrinkage compensation material | 3~10 |

As shown in the Table 3, the grout material composition of the present invention is preferably prepared by containing 3~10 wt % of shrinkage compensation material by mixture of CAS, CaO and $CaSO_4$.

In case of preparing the grout material composition by containing 3~10 wt % of shrinkage compensation material, the following mechanism is generated.

CAS($4CaO.3Al_2O_3.CaSO_4$) reacts with an anhydrite ($CaSO_4$) and a calcium hydroxide ($Ca(OH)_2$) when hydrated, thereby generating an expansible ettringite (ettringite; $3(C_3A.3CaSO_4.32H_2O)$) hydrate and enhancing strength.

This serves to fill an air gap of hardened cement, to restrain drying shrinkage occurring when the hardened cement is dried by an expansive pressure, and to enhance strength.

As the shrinkage compensation material is contained, drying shrinkage can be reduced to obtain workability, and concrete piles or a structure of high strength can be obtained.

If more than 10 wt % of shrinkage compensation material is contained, expansion may be caused to drastically lower strength. Thus, it is preferable to contain 3~10 wt % of shrinkage compensation material as proposed in the present invention.

Table 4 shows a mixing ratio of components of the grout material composition of the present invention according to a third example.

TABLE 4

| Division | Mixing Ratio [wt %] |
|---|---|
| High strength admixture | 2~10 |
| Type 1 Portland cement | 25~35 |
| Silica sand having particle size of 30~60 mesh | 30~45 |
| Silica sand having particle size of 60~100 mesh | 5~15 |
| Silica sand having particle size of 100~200 mesh | 5~10 |
| Polycarboxylate-based synthetic plasticizer | 0.05~0.5 |
| Polyglycol-based defoaming agent | 0.1~0.3 |
| Calcium sulphur aluminate-based hardener | 0.3~1.0 |

As shown in the Table 4, the grout material composition of the present invention, a property improvement agent compound, is preferably prepared by containing 0.05~0.5 wt % of polycarboxylate-based synthetic plasticizer, 0.1~0.3 wt % of polyglycol-based defoaming agent, and 0.3~1.0 wt % of calcium sulphur aluminate-based hardener.

As the property improvement agent compound is contained with the above mixing ratio, each admixture may have a maximized effect.

Preferably, a total containing amount of the property improvement agent compound is 0.5~2.0 wt %.

Among admixtures of the property improvement agent compound, a polycarboxylate-based synthetic plasticizer (polycarboxylate superplasticizer) has a molecular structure of a comb shape. More specifically, a main chain has a linear shape, and carboxylate and ether groups are adhered to side chains.

The carboxylate group serves as an absorption means adhered to cement particles, and a dispersion capability is implemented by an electrostatic repulsion of the carboxylate group and stereoscopic obstacles of the ether groups disposed on the side chains.

Such a polycarboxylate-based synthetic plasticizer has a characteristic that fluidity of concrete is increased and slump durability is enhanced, as the main chain is short, the side chains are long, and the number of the side chains is large.

Further, as the PEO groups (ether groups) on the side chains have hydrophilicity, water and hydrogen are combined with each other. This is extended to a cement group owing to excellent wettability.

Thus, most of mixing water exists within a gravitational sphere of PCA absorbed to cement particles. And chemical bonding water (non-dryable water), interlamellar water, or the like is increased when hydration is executed on the surface of the cement particles, and a ratio of capillary water which influences on durability such as strength is lowered. This can enhance compressive strength.

In the same chemical structure, compressive strength is increased as the main chain/side chain mole ratio is increased. As aforementioned, as dispersibility of cement particles is more excellent, early hydrates having cement particles become micro-sized and sophisticated. As a result, a surface area is increased, and an attractive force between generated hydrates is increased. This may enhance compressive strength.

The side chains having dispersion and stabilization effects due to a stereoscopic obstacle effect among cement particles, have effects of compression and accelerated congelation by an attractive operation with a hydrate layer.

Further, since the amount of water to be added to obtain the same operation consistency is reduced due to enhanced dispersibility, compressive strength can be enhanced.

Among the admixtures which constitute the property improvement agent compound, a polyglycol-based defoaming agent lowers a surface tension of an interface to extinguish air entrained in mortar, thereby reducing an air gap inside the mortar. This can enhance compressive strength and durability.

As aforementioned, the seawater resistant grout material composition of the present invention is mixed with water, thereby preparing a grout material having 12~18 wt % of water-cement.

A method for constructing an offshore wind turbine structure using the prepared grout material is as follows.

Figure 3:
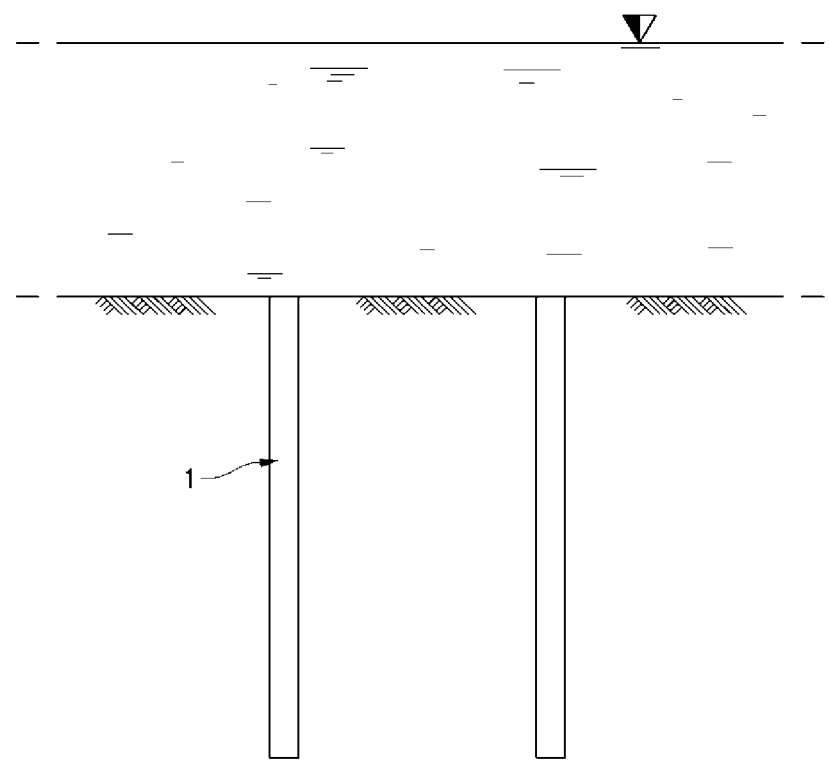
FIGS. 3 to 5 illustrate an example of method for constructing an offshore wind turbine structure using a seawater resistant grout material composition according to the present invention.

Firstly, punch holes 1 are formed by punching a sea bottom (refer to FIG. 3).

Figure 4:
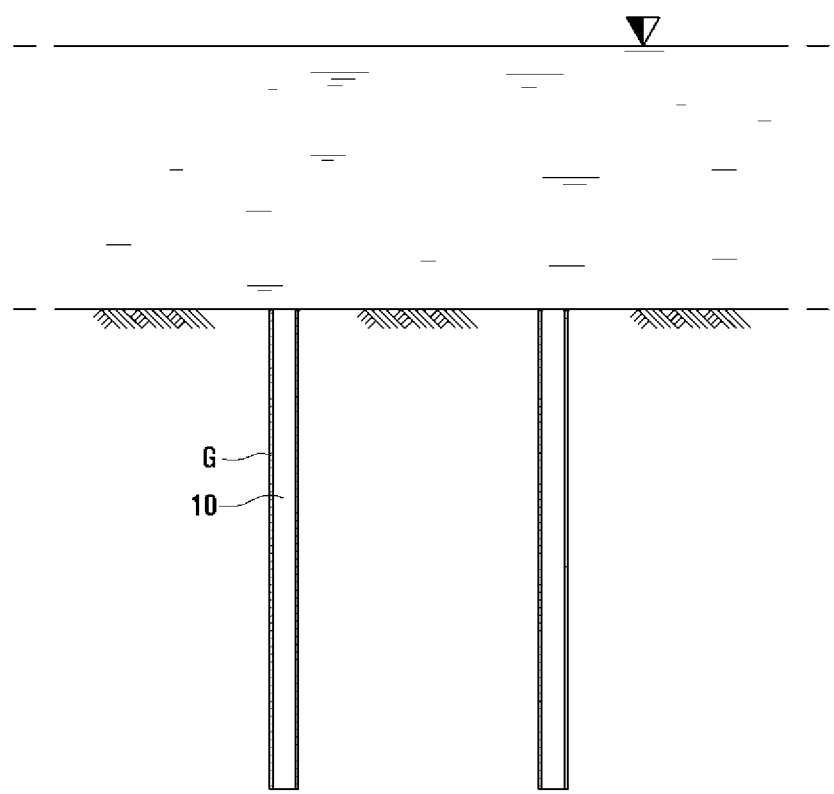

Then, piles 10 are installed at the punch holes 1. In this case, grouting is executed such that the grout material (G) is filled in a region between the punch hole 1 and the pile 10 (refer to FIG. 4).

Figure 5:
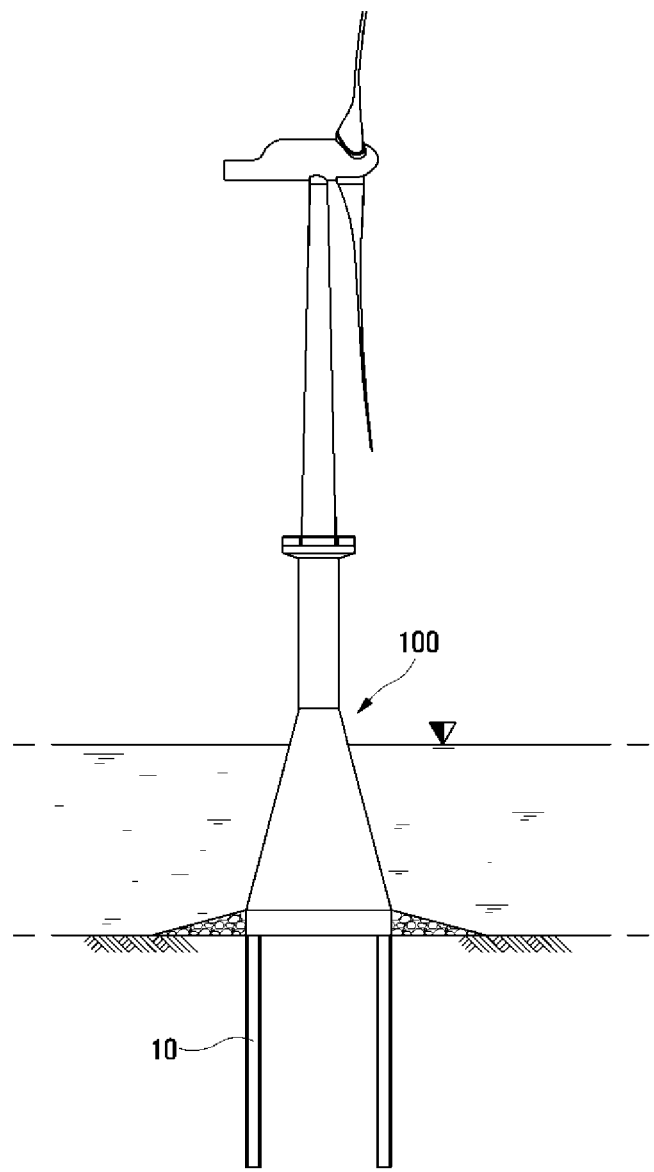

Then, an offshore wind turbine structure 100 is installed above the piles (refer to FIG. 5).

Hereinafter, experimental examples to verify the effects of the present invention will be explained.

Table 5 illustrates a mixing rate of the composition of the present invention, and a mixing rate of a composition of a comparative example, which were used to test a grout material composition.

TABLE 5

| Division | Cement | High strength admixture | 30~60 mesh | 60~100 mesh | 100~200 mesh | Shrinkage Compensation Material | Micro Silica | Property Improvement Agent |
|---|---|---|---|---|---|---|---|---|
| Comparative Example | 37 | 0 | 38 | 10 | 10 | 3 | 2 | 0 |
| First Example | 35 | 0 | 38 | 10 | 10 | 3 | 2 | 2 |
| Second Example | 34 | 3 | 38 | 10 | 10 | 3 | 2 | 0 |
| Third Example | 32 | 3 | 38 | 10 | 10 | 3 | 2 | 2 |

Figure 2:
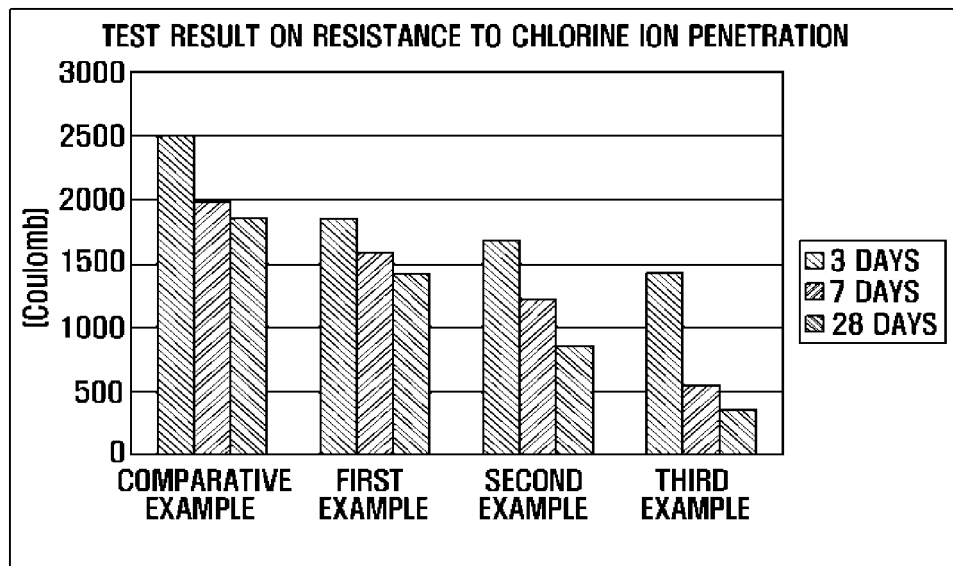

FIG. 1 and FIG. 2 illustrate compressive strength and resistance to chlorine ion penetration, in the first to third examples and the comparative example with respect to the composition of the present invention shown in the Table 5.

As a result on performance tests, the grout material composition of the present invention exhibited compressive strength (after 28 days) more excellent than that of the comparative example (refer to FIG. 1).

Further, the grout material composition of the present invention exhibited more excellent resistance to chlorine ion penetration, than in the comparative example (refer to FIG. 2).

That is, the grout material composition and the grout material using the same according to the present invention have excellent seawater resistance and increased compressive strength to allow resistance to cyclic loads due to wind and wave pressure. This can prolong the lifespan of the offshore wind turbine structure.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A seawater resistant grout material composition, comprising:
   2~10 wt % of high strength admixture;
   25~35 wt % of type I Portland cement;
   30~45 wt % of silica sand having a particle size of 30~60 mesh;
   5~15 wt % of silica sand having a particle size of 61~100 mesh; and
   5~10 wt % of silica sand having a particle size of 101~200 mesh,
   wherein the high strength admixture is obtained by mixing and pulverizing 45~99 wt % of slag and 1~55 wt % of anhydrite.

2. The seawater resistant grout material composition of claim 1, wherein the high strength admixture has a degree of particle size of 7000~10,000 cm$^2$/g.

3. The seawater resistant grout material composition of claim 1, further comprising 3~10 wt % of shrinkage compensation material obtained by mixing CAS (4CaO.3Al$_2$O$_3$.CaSO$_4$, CaO and CaSO$_4$ with each other.

4. The seawater resistant grout material composition of claim 1, further comprising:
   0.05~0.5 wt % of polycarboxylate-based synthetic plasticizer;
   0.1~0.3 wt % of polyglycol-based defoaming agent; and
   0.3~1.0 wt % of calcium sulphur aluminate-based hardener.

5. A seawater resistant grout material, comprising:
   the seawater resistant grout material composition of claim 1; and
   water,
   wherein a water-cement ratio is 12~18 wt %.

6. A method for constructing an offshore wind turbine structure, comprising:
   forming punch holes by punching a sea bottom;
   installing piles in the punch holes, and grouting by utilizing the grout material of claim 5; and
   installing an offshore wind turbine structure above the piles.

7. A seawater resistant grout material, comprising:
   the seawater resistant grout material composition of claim 2; and
   water,
   wherein a water-cement ratio is 12~18 wt %.

8. A seawater resistant grout material, comprising:
   the seawater resistant grout material composition of claim 3; and
   water,
   wherein a water-cement ratio is 12~18 wt %.

9. A seawater resistant grout material, comprising:
   the seawater resistant grout material composition of claim 4; and
   water,
   wherein a water-cement ratio is 12~18 wt %.

* * * * *